(No Model.)

W. H. TYLER.
CALF WEANER.

No. 350,707. Patented Oct. 12, 1886.

WITNESSES:
J. D. Garfield
C. Sedgwick

INVENTOR:
W. H. Tyler
BY Munn & Co.
ATTORNEYS.

UNITED STATES PATENT OFFICE.

WILLIAM H. TYLER, OF DAVID CITY, NEBRASKA.

CALF-WEANER.

SPECIFICATION forming part of Letters Patent No. 350,707, dated October 12, 1886.

Application filed July 13, 1886. Serial No. 207,896. (No model.)

*To all whom it may concern:*

Be it known that I, WILLIAM H. TYLER, of David City, in the county of Butler and State of Nebraska, have invented a new and Improved Calf-Weaner, of which the following is a specification, reference being had to the accompanying drawings, forming a part thereof, in which—

Figure 1:
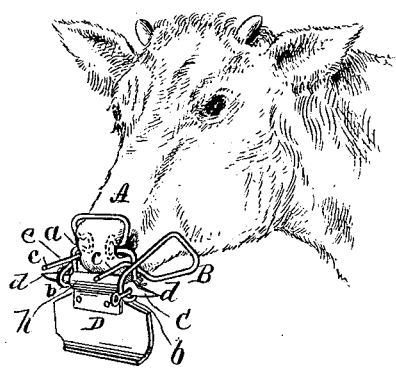
Figure 2:
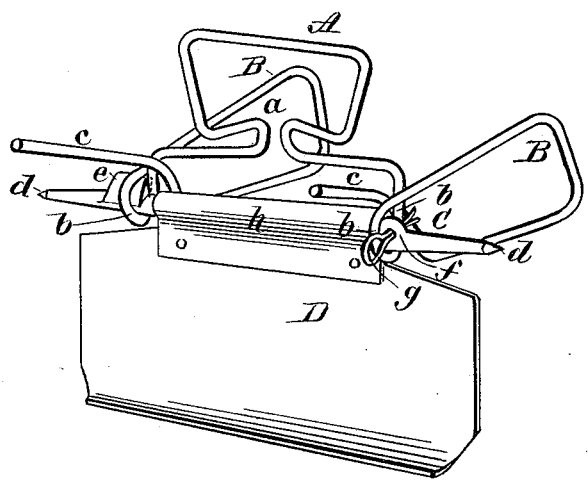

Figure 1 is a perspective view showing the application of my improved calf-weaner, and Fig. 2 is an enlarged perspective view of the weaner.

Similar letters of reference indicate corresponding parts in both figures of the drawings.

The object of my invention is to provide a simple, inexpensive, and safe device for weaning calves, and to keep cows from sucking themselves.

My invention consists of a wire frame having loops adapted to be received in the nose of the animal, and in the combination therewith of a metallic apron arranged to hang over the mouth, the wire frame having two projecting points for preventing the apron from being thrown over the nose.

The main frame A of the calf-weaner is formed of a single piece of wire bent twice near the middle of its length, approximately at right angles in the same direction, then bent inward to form loops $a$, which approach each other within a short distance, then bent outward parallel with the middle portion, then again bent approximately at right angles with the middle portion, and curved to form the eyes $b$, then bent backward and curved, forming the loops B, afterward bent forward toward the eyes $b$, then upward and again forward, forming projecting ends $c$. The loops B are thus arranged at right angles to the body of the frame. A bar, C, provided at opposite ends with points $d$, has a lug, $e$, near one end, and near the opposite end an eye, $f$. The bar C is inserted in the eyes $b$ of the frame A, with the lug $e$ against the side of one of the eyes $b$ and the eye $f$ outside of the opposite eye. To the eye $f$ is fitted a spring-key, $g$. Upon the bar C is placed a sheet-metal apron, D, which is reduced in width at its upper edge and looped or returned upon itself to form an eye, $h$, for receiving the bar. The lower edge of the apron is bent outward slightly to facilitate its sliding upon the ground, also to increase its rigidity without increasing its weight.

The weaner is applied by liberating the frame A from the bar C by withdrawing the spring-key $g$ and allowing the sides of the frame to spring apart. The loops $a$ $a$ are then introduced into the nose of the animal, as shown in Fig. 1, and the frame is pressed together, the spring-key $g$ is reinserted in the eye $f$ and its ends spread apart to prevent the key from coming out, when the weaner will be secured in place, where it will be worn until removed by the withdrawal of the spring-key. The points $d$ of the bar C will prick the cow, so as to effectually prevent the calf from sucking sidewise, and the apron D will drop down over the mouth, so the calf cannot suck in front when its head is raised; but when the head is lowered in position to feed upon the grass the apron D will fall out of the way. The side loops, B, will prevent the animal from taking the teat into the sides of the mouth, as it holds the upper lip down, and the projecting ends $c$ of the frame A prevent the apron D from being thrown up over the end of the nose, but will allow the apron D to rise high enough to allow the calf to eat or drink with ease.

The weaner has no short points to catch into the ground and cause the weaner to make the nose sore, and as there are no sharp points in front the cow will not be pricked or gouged when the calf pouts.

I am aware that calf-weaners have been provided with inwardly-projecting loops or arms for entering the nostrils of the animal to secure the weaner in position; and I am also aware that weaners formed of suspended plates or aprons are old, and I therefore do not claim such invention.

Having thus described my invention, what I claim as new, and desire to secure by Letters Patent, is—

1. A calf-weaner consisting of a wire frame formed with inwardly-projecting loops $a$ for insertion in the animal's nostrils, the eyes $b$, and rearwardly-projecting side guard-loops, B, the bar C, secured in the eyes $b$, and the apron D, suspended from the said bar, substantially as herein shown and described.

2. In a calf-weaner, the frame A, formed with the inwardly-projecting loops *a*, the eyes *b*, the rearwardly-projecting guard-loops B, and the forwardly-projecting arms *c*, in combination with the bar C, secured in the said eyes, and the apron suspended from the bar, substantially as herein shown and described.

3. As an improved article of manufacture, a calf-weaner formed of the wire frame A, having loops *a*, eyes *b*, side loops, B, and projecting ends *c*, the cross-bar C, provided with the lug *e*, and eye *f*, inserted in the eyes *b* of the frame A, the apron D, provided with the eye *h*, received on the bar C, and the spring-key *g*, inserted in the eye *f* of the bar C, substantially as shown and described.

WILLIAM H. TYLER.

Witnesses:
MATT MILLER,
T. A. HORN.